3,030,359
PROCESS FOR THE PREPARATION OF α,β-UNSATURATED CARBONYL COMPOUNDS
Josef Ferdinand Arens and Hendrik Jan Tjakob Bos, Groningen, and Hendrik Vieregge, Haren, Netherlands, assignors to Organon Inc., West Orange, N.J., a corporation of New Jersey
No Drawing. Filed Aug. 15, 1960, Ser. No. 49,431
Claims priority, application Netherlands Aug. 24, 1959
6 Claims. (Cl. 260—239.55)

The invention relates to the preparation of α,β-unsaturated carbonyl compounds from carbonyl compounds, the molecule of which has at least 2 carbon atoms less.

A number of reactions in which a carbonyl compound is converted into an α,β-unsaturated carbonyl compound having a greater number of carbon atoms, is described in literature. Of these known reactions the following are mentioned:

(1) The aldol-condensation, followed by dehydratation. This reaction can only be used with a small number of compounds and is applied in industry in a very limited number of cases only; mention may be made here of the preparation of acrolein from acetaldehyde and formaldehyde.

(2) The Perkin-reaction, in which an aromatic aldehyde is reacted with the anhydride of an aliphatic acid in the presence of a salt of the same acid to form an α,β-unsaturated acid.

(3) The Claisen-reaction, in which an aromatic aldehyde is reacted with ethylacetate or a similar ester in the presence of metallic sodium and a trace of alcohol. In this reaction the ester of an α,β-unsaturated acid is formed.

(4) The Reformatsky-reaction, in which a carbonyl compound is reacted with an α-halo-ester and zinc; after hydrolysis and dehydratation the ester of an α,β-unsaturated acid is obtained.

(5) The coupling of a carbonyl compound with a metal derivative of ethoxy-ethyne, in which after hydrolysis an ethoxy ethyne carbinol is formed, which, by treatment with an acid, can be converted into an α,β-unsaturated ester or—after partial reduction of the ethyne bond—into an α,β-unsaturated aldehyde.

It was found now that α,β-unsaturated carbonyl compounds can be prepared from carbonyl compounds having at least 2 carbon atoms less, by reacting them with an alkyne compound in an indifferent solvent in the presence of a Lewis acid.

The reaction taking place in the present process can be represented by the following equation:

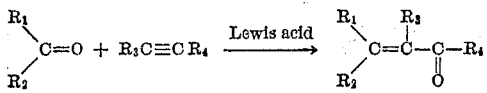

in which

R₁ represents hydrogen, an aliphatic, aromatic, araliphatic or alicyclic hydrocarbon rest, R₂ represents hydrogen, a substituted hydroxyl group, an amino group whether or not substituted, an aliphatic, aromatic, araliphatic or alicyclic hydrocarbon rest, or R₁ and R₂ together form an alicyclic ring with the adjacent carbon atom, R₃ represents hydrogen, an alkyl, aryl, aralkyl or an alicyclic hydrocarbon rest and R₄ represents hydrogen, an alkoxy group, an alkylthio group, an aliphatic, aromatic, araliphatic or alicyclic hydrocarbon rest.

An advantage of the present process over the known processes is that it can be applied with different compounds, by means of which a very great number of compounds, part of which was difficult of access so far, can be prepared in this manner.

Other advantages are that the process can be carried out very easily, that high yields are obtained, that it quickly leads to the object required and that it takes place under mild conditions.

Lewis acids that are very suitable to be used in the present process are, for example, metal halides, such as aluminium chloride, ferric chloride, stannic chloride, boron fluoride and zinc chloride.

In particular the compounds that by coordination with the oxygen atom of the carbonyl group activate the carbon atom of that group—render it positive—have proved good catalysts. Besides the said metal halogenides such as for example compounds as boric acid esters and aluminium sulphate are also quite suitable. Preferably BF₃ is used, because with it slightly reactive carbonyl groups, too, can be activated and because with this compound excellent yields are generally obtained.

The amount of the Lewis acid used can differ very greatly. The best results are obtained when per gram-molecule of the carbonyl compound use, 1-gram-molecule of the Lewis acid is used. With smaller amounts of the Lewis acid it is also possible, however, to obtain reasonable yields.

When boron trifluoride is used this compound is preferably first reacted with ether, after which the thus formed boron trifluoride etherate is added to the reaction mixture. In this way more accurate dosaging of the added catalyst is possible, which is more difficult when the gaseous BF₃ is used.

The reaction is preferably carried out at a temperature below 0° C., because at higher temperatures polymerisation of the alkyne compound may occur under the influence of the Lewis acid, which may give rise to discolouration and contamination of the reaction product.

As reaction medium solvents can be used that do not take part in the reaction. In general they are solvents without reactive groups, such as hydroxyl, keto, and amino groups. Solvents that qualify for the purpose are, for example, carbon disulfide, ethers, dioxane, petroleum ether, chloroform, and aromatic hydrocarbons. Preferably diethyl-ether is used, because most compounds readily dissolve in it, because good yields are obtained when it is used and because the ether can be easily removed by evaporation when the reaction is completed. High yields are also obtained with carbon disulfide as solvent.

The amounts of the reaction components are preferably chosen so that there are equivalent amounts of the carbonyl compound and the alkyne compound. In the case of an excess of the carbonyl compound there is a possibility that when the reaction is completed, this excess polymerises under the influence of the Lewis acid, thus giving rise to contamination of the reaction mixture.

An excess of the alkyne compound is likewise less desirable, because after completion of the reaction desired, this excess may react with the α,β-unsaturated carbonyl compound formed, which causes the reaction mixture to become contaminated and the yield to decrease.

The following examples illustrate the invention. Yields are always calculated on the basis of the carbonyl compound.

EXAMPLES

I

*Cinnamic Acid Ethyl Ester*

21 g. of benzaldehyde are dissolved in 100 ml. of ether, whereupon after cooling to 0° C., 28 g. of boron trifluoride etherate are added to this solution, after which 14 g. of ethoxy-ethyne are slowly added dropwise, the temperature of the mixture being kept at 0° C. After standing 24 hours the reaction mixture is successively washed with a solution of potassium carbonate and water. After drying over sodium sulphate the ether is evaporated, whereupon the cinnamic acid ethyl ester is obtained by distillation in vacuum. Boiling point (15 mm. Hg): 140° C., yield 90%.

II

*Cinnamic Acid Ethyl Ester*

In the same way as described in Example I the cinnamic acid ethyl ester is prepared, this time, however, by using 37 g. of magnesium bromide instead of boron trifluoride. Yield 72%.

III

*Crotonic Acid Methyl Ester*

11.2 g. of methoxy ethyne are added to a solution of 8.8 g. of acetaldehyde and 28.4 g. of $BF_3$-etherate in 50 ml. of ether cooled to $-10°$ C. After standing 24 hours the crotonic acid methyl ester formed is isolated by washing the reaction mixture with a soda solution and water, drying it with sodium sulphate, evaporation of the ether and distillation. Boiling point 118–121° C., yield 83%.

IV

*β,β-Dimethyl Acrylic Acid Ethyl Ester*

In the manner as described in Example I the β,β-dimethyl acrylic acid ethyl ester is prepared starting from 5.8 g. of acetone, 7 g. of ethoxy ethyne and 14.2 g. of $BF_3$-etherate. Yield 72%. Boiling point at a pressure of 30 mm. Hg is 61° C.

V

*α,β-Dimethyl Thiocrotonic Acid Ethyl Ester*

A solution of 11.6 g. of acetone and 25 g. of $BF_3$-etherate is prepared in 50 ml. of ether. This solution is cooled to $-10°$ C. To the cooled solution 20 g. of ethyl thiopropyne are added, after which the solution is allowed to stand for 20 hours at $-10°$ C. The reaction mixture is washed with a solution of sodium carbonate and distilled water, and dried with sodium sulphate. The ether is evaporated and the α,β-dimethyl thiocrotonic acid ethyl ester formed, purified by distillation under vacuum. This ester, which has not been described before in literature, has a boiling point of 90° C. at a pressure of 15 mm. Hg.

VI

*β-Ethoxy Crotonic Acid Ethyl Ester*

In the manner of Example I 8.8 g. of ethyl acetate, 7 g. of ethoxy-ethyne and 14 g. of $BF_3$-etherate are reacted. The β-ethoxy-crotonic acid ethyl ester is obtained in pure condition by vacuum distillation; the boiling point is at 15 mm. Hg 90° C. Yield 72%.

VII

*β-Ethoxy Acrylic Acid Ethyl Ester*

The β-ethoxy acrylic acid ethyl ester is obtained by reacting in the manner of Example I 14.8 g. of ethylformate, 14 g. of ethoxy-ethyne in 50 ml. of ether under the influence of 20 g. of $BF_3$-etherate. Yield 65%. The compound is purified by vacuum distillation and boils at a pressure of 15 mm. Hg at 90° C.

VIII

*β-Methyl-Thiocrotonic Acid Ethyl Ester*

The β-methyl-thiocrotonic acid ethyl ester is obtained by reacting in the manner of Example I, 11.6 g. of acetone, 17.6 g. of ethylthio-ethyne in 50 ml. of ether under the influence of 25 g. of $BF_3$-etherate. The product distils at a temperature of 65° C. at a pressure of 15 mm. Hg.

IX

*Acrylic Acid Ethyl Ester*

The acrylic acid ethyl ester is prepared in the manner of Example I, by reacting 6.0 g. of formaldehyde and 14 g. of ethoxy-ethyne in 30 ml. of ether in the presence of 25 g. of $BF_3$-etherate. The compound distils at about 100° C. Part of the product is obtained as polyacrylate.

X

*β-Dimethylamino-Acrylic Acid Ethyl Ester and Trimesic Acid-Tri-Ethyl Ester*

By putting 14 g. of ethoxy-ethyne in 20 g. of dimethylformamide containing 30 g. of $BF_3$-etherate and allowing the mixture to stand for 24 hours at 0° C. the β-dimethylamino acrylic acid ethyl ester is formed. It is obtained by washing with a potassium carbonate solution at $-10°$ C. and extraction with ether, after which the ether is evaporated from the ether extract to obtain the above mentioned acrylic acid ester. Yield 40%. Boiling point at 1 mm. Hg 68° C. The residue contains the trimesic acid triethylester, which is obtained by recrystallising a few times from aqueous methanol; melting point 132–134° C. This ester is obtained as main product, by treating the reaction mixture not directly with a potassium carbonate solution, but by keeping it first for 24 hours at room temperature after adding ethanol.

XI

*β-Methyl-α-Ethyl-Crotonic Acid Ethyl Ester*

The β-methyl-α-ethyl crotonic acid ethyl ester is prepared in the manner of Example I, by reacting 11.6 g. of acetone, 19.6 g. of ethoxy butyne and 28.4 g. of $BF_3$-etherate in 60 ml. of ether. Yield 78%. Boiling point 166–168° C.

XII

*Benzal-Acetophenone*

21.2 g. of benzaldehyde are dissolved in 50 ml. of ether, to which solution 20 g. of $BF_3$-etherate are added at room temperature. Then 20.4 g. of phenyl acetylene are added, after which the mixture is left to stand one night. After washing the mixture with sodium carbonate and water the ether is evaporated and the residue distilled in vacuum. The product obtained is recrystallised from a mixture of ether and petroleum ether. Thus the benzal-acetophenone is obtained. Melting point 62° C. Yield 60%.

XIII

*Benzal-Acetophenone*

In the manner of Example XII benzal-acetophenone is prepared. Instead of boron trifluoride aluminium chloride is used as a catalyst. Now the yield is 48%.

XIV

Benzal-Acetophenone

In the manner of Example XII benzal-acetophenone is prepared, but instead of boron trifluoride magnesium bromide is used as a catalyst.

The magnesium bromide used as a catalyst is prepared by the reaction of bromine on a suspension of magnesium in ether. Yield of pure benzal-acetophenone: 29%.

XV

β-Ionylidene Acetic Acid Ethyl Ester 19.3 g. of β-ionone are dissolved in 50 ml. of ether, to which solution, which is cooled to 0° C., 14 g. of BF₃-etherate and 7 g. of ethoxy-ethyne are added, after which the mixture is allowed to stand for 15 hours. Then the reaction mixture is washed with a solution of sodium carbonate and with water, and dried over sodium sulphate. After evaporation of the ether the β-ionylidene acetic acid ethyl ester is obtained by means of distillation under high vacuum. Yield 58%.

XVI

Ethyl Ester of the Vitamin A-Acid 25.8 g. of the so-called $C_{18}$-ketone of the vitamin A-synthesis are dissolved in 70 ml. of ether, whereupon after cooling to 0° C., 14.2 g. of BF₃-etherate and 7 g. of ethoxy-ethyne are added to the solution. After standing 20 hours the ethyl-ester of the vitamin A-acid is obtained in the manner of Example XV. Yield 65%

XVII

3-Ethylene Glycol Ketal of Δ⁴,¹⁷-3,11-Diketo-Pregnadiene-21-carboxylic Acid Methyl Ester 25.2 g. of the 3-ethylene glycol ketal of Δ⁴-3,11,17-triketo-androstene are dissolved in 150 ml. of ether. After cooling to —5° C., 5.6 g. of methoxy-ethyne and 14.2 g. of BF₃-etherate are added to the solution, after which the mixture is allowed to stand for 24 hours at —5° C. The reaction mixture is washed with a solution of sodium carbonate and water, and then dried over sodium sulphate. After evaporation of the ether the residue is recrystallised a few times from a mixture of ethyl acetate and petroleum ether to obtain the pure product; melting point 188° C.; Yield 58%.

XVIII

According to the following example the reaction products of Tables I and II are prepared.

0.1 molecule of boron trifluoride etherate diluted with 50 ml. of absolute ether are passed into a flask fitted with stirrer, dropping funnel and thermometer. After cooling to —10° 0.1 molecule of the carbonyl compound (aldehyde, ketone, ester, acid amide) dissolved in 50 ml. of absolute ether is added in 15–30 minutes, when usually a slight heat effect is noticeable and in some cases a precipitate of a BF₃-complex is formed. Next 0.1 molecule of ethyne ether dissolved in 75 ml. of absolute ether is added dropwise in 2–3 hours at —10°. During the addition evolution of heat takes place and in most cases a light yellow to brown precipitate is formed.

After bringing the temperature of the reaction mixture up to 0° hydrolysis takes place with a solution of 20% potassium carbonate (0.1 molecule K₂CO₃) which is added in 20–30 minutes. Under considerable evolution of heat decomposition of the complex takes place. After the evolution of carbonic acid has ceased the ethereal solution is separated, washed with a K₂CO₃ solution and water, and dried on CaSO₄. After evaporation of the ether the reaction product is obtained by fractionated distillation.

The carbonyl compounds mentioned in Table I have been reacted with ethoxy-ethyne as ethyne ether.

TABLE I

| Carbonyl compound | Reaction product | Boiling point or melting point | Yield in percent |
|---|---|---|---|
| formaldehyde (trioxane). | acrylic acid ethylester. | B.P. 98–104° | 37 |
| acetaldehyde | crotonic acid ethylester. | B.P. 128–132° | 41 |
| propionaldehyde | β-ethylacrylic acid ethylester. | B.P. 50–64°/10 mm. | 28 |
| butyraldehyde | β-propylacrylic acid ethylester. | B.P. 72–98°/11 mm. | 22 |
| acrolein | β-vinylacrylic acid ethylester. | B.P. 50–60°/10 mm. | 29 |
| crotonaldehyde | sorbic acid ethylester. | B.P. 75.5–76°/10 mm. | 52 |
| benzaldehyde | cinnamic acid ethylester. | B.P. 94–98.5°/0.8 mm. | 48–50 |
| anisaldehyde | p-methoxy cinnamic acid ethylester. | M.P. 47.5–49° | 54 |
| p-nitrobenzaldehyde | p-nitrocinnamic acid ethylester. | M.P. 134.5–136° | 25 |
| α-naphthaldehyde | β-naphthyl-(1)-acrylic acid ethylester. | M.P. 37–37.5° | 50 |
| thiophenaldehyde | β-(α-thienyl)-acrylic acid ethylester. | B.P. 80–86°/0.5–1 mm. | 53 |
| acetone | β-methylcrotonic acid ethylester. | B.P. 140–156° | 82 |
| butanone | β-methyl-α, β-pentenic acid ethylester. | B.P. 170–172°/770 mm. | 71 |
| diethylketone | β,β-diethylacrylic acid ethylester. | B.P. 69–69.5°/10 mm. | 59 |
| acetophenone | β-methylcinnamic acid ethylester. | B.P. 91–115°/0.7 mm. | 50 |
| cyclopentanone | cyclopentylidene acetic acid ethylester. | B.P. 88–88.5°/10 mm. | 65 |
| cyclohexanone | cyclohexylidene acetic acid ethylester. | B.P. 102–105°/12 mm. | 77 |
| cycloheptanone | cycloheptylidene acetic acid ethylester. | B.P. 115–116°/10 mm. | 65 |
| β-ionone | β-ionylidene acetic acid ethylester. | B.P. 126–131°/0.5 mm. | 50 |
| ethylformiate | β-ethoxy acrylic acid ethylester. | B.P. 86–90°/13 mm. | -------- |
| dimethylformamide | β,β-dimethyl acrylic acid ethylester. | B.P. 63–63.5°/1 mm. | 25 |

In an analogous manner acetone has been reacted with the alkyn compounds mentioned in Table II. For the reaction products obtained and further details see said table.

TABLE II

| Alkyn compound | Reaction product | Boiling point | Yield in percent |
|---|---|---|---|
| isobutoxypropyne | α,β-dimethyl crotonic acid isobutyl ester. | 70–86°/15 mm. | -------- |
| methoxyheptyne | α-pentyl-β-methyl crotonic acid methyl-ester. | 44.0–44.2°/0.4 mm. | 42 |
| ethoxyisopentyne | α-isopropyl-β-methyl crotonic acid ethylester. | 69–70°/10 mm. | 41 |
| ethoxyheptyne | α-pentyl-β-methyl crotonic acid ethylester. | 46.0–46.2°/0.2 mm. | 51 |
| methoxypentyne | α-propyl-β-methyl crotonic acid methyl-ester. | 65.5–66.5°/10 mm. | 59 |

What we claim is:

1. Process for the preparation of α,β-unsaturated carbonyl compounds of the general formula:

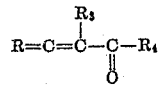

in which

R is a member of the group consisting of a radical forming an alicyclic ring with the adjacent carbon atom and $R_1R_2$ in which $R_1$ represents a member of the group consisting of hydrogen, an aliphatic, aromatic, araliphatic and alicyclic hydrocarbon radical $R_2$ represents a member of the group consisting of hydrogen, a substituted hydroxyl group, an amino group, a substituted amino group, an aliphatic, aromatic, araliphatic and alicyclic hydrocarbon radical
$R_3$ represents a member of the group consisting of hydrogen, an alkyl, aryl, aralkyl and an alicyclic hydrocarbon radical and
$R_4$ represents a member of the group consisting of an alkoxy group, an alkylthio group, an aliphatic, aromatic, ariliphatic and alicyclic hydrocarbon radical, comprising reacting a carbonyl compound of the general formula $R=C=O$ with an alkyne compound of the general formula $R_3C\equiv CR_4$ in an inert solvent in the presence of a Lewis acid.

2. Process according to claim 1, in which boron trifluoride is used as Lewis acid.

3. Process according to claim 1, in which the reaction is carried out below 0° C.

4. Process according to claim 1, in which the reaction is carried out in ethyl ether.

5. Process according to claim 1, in which the reaction is carried out in carbon disulfide.

6. Process according to claim 1, in which the reaction is carried out in the presence of a Lewis acid which, by coordination with the oxygen atom of the carbonyl group in the carbonyl compound, activates the carbon atom of that group.

No references cited.